US010189752B2

(12) United States Patent
Achille et al.

(10) Patent No.: US 10,189,752 B2
(45) Date of Patent: Jan. 29, 2019

(54) MOISTURE BARRIER COATINGS

(71) Applicant: Surface Chemists of Florida Inc., Jupiter, FL (US)

(72) Inventors: Felix Achille, West Palm Beach, FL (US); Victor Granquist, Jupiter, FL (US); A. Jaeton Glover, Jupiter, FL (US); Alice Hudson, Jupiter, FL (US)

(73) Assignee: SURFACE CHEMISTS OF FLORIDA, INC., Jupiter, FL (US)

( * ) Notice: Subject to any disclaimer, the term of this patent is extended or adjusted under 35 U.S.C. 154(b) by 0 days.

(21) Appl. No.: 15/656,624

(22) Filed: Jul. 21, 2017

(65) Prior Publication Data

US 2018/0022661 A1    Jan. 25, 2018

Related U.S. Application Data

(60) Provisional application No. 62/493,952, filed on Jul. 21, 2016.

(51) Int. Cl.

| | | |
|---|---|---|
| *C05G 3/00* | (2006.01) | |
| *C09D 175/04* | (2006.01) | |
| *C09D 163/00* | (2006.01) | |
| *C09D 7/65* | (2018.01) | |
| *C09D 5/00* | (2006.01) | |
| *C09D 7/63* | (2018.01) | |
| *C08K 5/01* | (2006.01) | |
| *C08K 5/103* | (2006.01) | |

(Continued)

(52) U.S. Cl.
CPC ......... *C05G 3/0035* (2013.01); *C05G 3/0023* (2013.01); *C05G 3/0029* (2013.01); *C05G 3/0058* (2013.01); *C09D 5/00* (2013.01); *C09D 7/63* (2018.01); *C09D 7/65* (2018.01); *C09D 163/00* (2013.01); *C09D 175/04* (2013.01); *C08K 5/01* (2013.01); *C08K 5/103* (2013.01); *C08L 23/02* (2013.01); *C08L 23/0853* (2013.01); *C08L 33/04* (2013.01)

(58) Field of Classification Search
None
See application file for complete search history.

(56) References Cited

U.S. PATENT DOCUMENTS 3,223,518 A    12/1965    Hansen
3,252,786 A    5/1966    Bozzelli
(Continued)

FOREIGN PATENT DOCUMENTS

WO    2007022031    2/2007

OTHER PUBLICATIONS

L.H. Sperling: "Interpenetrating Polymer Networks: An Overview", American Chemical Society, May 5, 1994.

*Primary Examiner* — Wayne A Langel
(74) *Attorney, Agent, or Firm* — Fox Rothschild LLP

(57) ABSTRACT

Moisture barrier coatings and sealants comprised of mixtures of organic wax and wax soluble polymer dispersed into one or more components of a thermoset polymer which may form a semi-interpenetrating polymer network when the thermoset polymer is subsequently cured on the substrate. The organic wax and wax soluble polymer substantially improve the moisture barrier properties of the thermoset polymer and provides an effective moisture barrier coating that is non-tacky at the cure temperature of the thermoset polymer, without the requirement for a cooling step.

15 Claims, 2 Drawing Sheets

Example 36

Not homogenized

Homogenized

(51) Int. Cl.
   *C08L 23/02* (2006.01)
   *C08L 23/08* (2006.01)
   *C08L 33/04* (2006.01)

(56) References Cited

U.S. PATENT DOCUMENTS

| | | | |
|---|---|---|---|
| 5,137,563 A | | 8/1992 | Valkanas |
| 5,300,135 A | | 4/1994 | Hudson et al. |
| 5,476,528 A | * | 12/1995 | Trimm .................... C05D 9/02 71/21 |
| 5,478,375 A | | 12/1995 | Hudson |
| 5,538,531 A | | 7/1996 | Hudson et al. |
| 5,698,002 A | | 12/1997 | Hudson |
| 5,803,946 A | | 9/1998 | Petcavich et al. |
| 5,858,094 A | | 1/1999 | Detrick et al. |
| 5,984,994 A | | 11/1999 | Hudson |
| 6,231,633 B1 | * | 5/2001 | Hirano ................ C05G 3/0035 71/28 |
| 6,663,686 B1 | | 12/2003 | Geiger et al. |
| 7,018,440 B2 | | 3/2006 | Tabei |
| 7,682,656 B2 | * | 3/2010 | Xing ........................ B01J 2/006 427/242 |
| 8,303,680 B2 | | 11/2012 | Mente |
| 8,795,406 B2 | | 8/2014 | Maruvada et al. |
| 8,888,887 B2 | | 11/2014 | Hargrove et al. |
| 2003/0157247 A1 | * | 8/2003 | Chikami ................ A01N 25/26 427/212 |
| 2006/0115586 A1 | * | 6/2006 | Xing ........................ B01J 2/006 427/212 |
| 2010/0307211 A1 | | 12/2010 | Xing et al. |
| 2014/0033779 A1 | * | 2/2014 | Bertin .................... A01N 25/26 71/64.07 |
| 2015/0376077 A1 | * | 12/2015 | Barr ..................... C05G 3/0029 71/28 |
| 2016/0297725 A1 | | 10/2016 | No et al. |

* cited by examiner

MOISTURE BARRIER COATINGS

CROSS REFERENCE TO RELATED APPLICATION

This application claims priority to U.S. Provisional Application No. 62/493,952 filed Jul. 21, 2016, the disclosure of which is incorporated herein by reference.

FIELD OF THE INVENTION

This invention relates to moisture barrier coatings for applications including controlled release fertilizers.

BACKGROUND OF THE INVENTION

Sealant compositions containing waxes are widely used as effective moisture barriers in coating applications, and particularly as sealants for controlled release fertilizers. The available sealant compositions are typically thermoplastic waxy materials that are cohesive above their melting points and thus require agitation during a cooling step, for example in a fluid bed cooler or a rolling drum, to produce non-agglomerated, free flowing particles. This cooling step adds capital costs for the equipment and added space, and also adds time and energy costs to the process. An effective sealant that does not require a cooling step would reduce costs and simplify the sealant process.

It is known to mix waxes with thermoset polymers, and apply to fertilizer as in U.S. Pat. No. 6,663,686 to Geiger et al, which teaches the addition of an organic wax to a polyol, applying the polyol wax blend to the fertilizer, and subsequently curing the polyol with an isocyanate.

Hargrove et al, U.S. Pat. No. 8,888,887, teaches a controlled release fertilizer coating which is a reaction product of a mixture including an isocyanate and a polyol and also including a modified wax which is an unsaturated wax component that is cross-linked with sulfur, oxygen and/or a peroxide cross-linking moiety, or a mixture or a combination of an unsaturated wax component and a polyhydroxyl compound that is cross-linked with sulfur, oxygen, and/or a peroxide cross-linking moiety.

It is known to use compositions comprising waxes and wax soluble polymers as sealants applied to sulfur coated fertilizers, as in U.S. Pat. Nos. 5,300,135, 5,478,375 and 5,984,994 to Hudson, et al. These compositions are nonreactive wax based thermoplastic materials. To form a free flowing composition, the sealed granules must be cooled with low shear agitation, typically in a fluid bed cooler, after the application and spreading of the sealant on the surface of the sulfur coated fertilizer.

It is also known to apply a sealant composition over polymer coated fertilizers as is taught in U.S. Pat. No. 5,858,094 to Detrick, and U.S. Pat. Nos. 5,538,531 and 5,698,002 to Hudson. The sealants are described as waxes, and the sealed coated fertilizer granules must be cooled after the sealant application, typically in a fluid bed cooler.

U.S. Pat. No. 5,137,563 to Valkanas teaches controlled release coating for fertilizers comprising a mixture of wax and specific wood rosins or dimerized rosins with a high content of conjugated unsaturation. The waxy component is selected from the group consisting of linear or branched paraffin waxes, polyethylene waxes, polyethylene oxide, fat, fatty acids and cellulose products and derivatives thereof preferably having a melting point from 70 degrees C. to 130 degrees C.

U.S. Pat. No. 3,223,518 to Hansen teaches multiple fertilizer coatings that include alkyds, and may include coatings of other polymers and waxes including paraffin and natural and synthetic waxes. The coatings are applied as discrete coats, and the components of the coats are not commingled with the components of preceding or subsequent coatings.

U.S. Pat. No. 3,252,786 to Bozzelli, et al, teaches the addition of a minor portion of oxidized wood rosin and wood rosin derivatives to petroleum wax. Particles of fertilizer materials are dispersed into the wax-rosin mixture and milled to very small particles to form a slow release fertilizer composition.

WO 2007/022031, Perez et al, discloses the use of interpenetrating polymer networks (IPN's) as protective coatings for metal surfaces. The IPN's are composed of polyolefins and epoxy resins.

US Appl 2010/0307211, to Xing, et al discloses fertilizer coatings that comprise a polyol, an isocyanate, a wax and an epoxidized fatty acid triglyceride. The epoxidized fatty acid triglyceride is added as a compatibilizer for the wax and polyol.

U.S. Pat. No. 5,803,946 to Petcavich, et al, discloses a controlled release coating for fertilizers that is described as an interpenetrating polymer network. It is comprised of a biuret, a urethane and tung oil interlinked one with another. The isocyanate is first applied to the fertilizer particles followed by a mixture of the polyol and tung oil and an initiator.

U.S. Pat. No. 8,303,680 to Mente, et al discloses polyurethane encapsulated fertilizer particles that comprise polymeric particles as a discontinuous phase in the polyurethane. The polymeric particles are from about 0.1 to about 10 microns in diameter. The polymeric particles disclosed are generally vinyl polymers that may incorporate urethane reactive monomers such as unsaturated polyols, to impart crosslinking to the polyurethane coating. The polymeric particles may also be polyurethanes. It is believed that the polymeric particles impart increased water repellency and resiliency to the encapsulated fertilizer particles.

U.S. Pat. No. 7,018,440 to Tabai discloses a granular fertilizer which is coated with a first water-insoluble material layer, a thermosetting resin layer, a second water-insoluble material layer, and a second thermosetting resin layer. The water-insoluble material layers are generally a wax and can be a mixture of petroleum wax and ethylene-vinyl acetate. The thermosetting resin can be urethane resin, epoxy resin, alkyl resin, unsaturated polyester resin, phenol resin, urea resin, melamine resin, silicone resin and the like.

U.S. Pat. No. 8,795,406 to Maruvada discloses a controlled release fertilizer comprising a particulate plant nutrient surrounded by a polyurethane coating consisting of a mixture of a cross-linked polyol and an isocyanate, and optionally an unsaturated wax. The polyol can be cross-linked with itself, with a triglyceride or with an unsaturated wax, by reaction with sulfur, oxygen, and/or a peroxide cross-linking moiety.

The need for a cooling step with agitation typically carried out in a fluid bed cooler or a rolling drum, particularly when a wax based sealant or wax based component is used in the coating process, adds costs and production space requirements to the coating process. It would be highly desirable to produce effective wax containing sealed free flowing granules without the need for a cooling step.

SUMMARY OF THE INVENTION

It has been discovered that the addition of a mixture of an organic wax and a wax soluble straight chain or branched polymer to one or more components of a thermoset polymer which may form a semi-interpenetrating polymer network when the thermoset polymer is subsequently cured on the surface of a substrate substantially improves the moisture barrier properties of the thermoset polymer and provides an effective moisture barrier coating that is non-tacky at the cure temperature of the thermoset polymer, without the requirement for a cooling step.

In a preferred embodiment the thermoset polymer containing the mixture of an organic wax and a wax soluble polymer is applied to surfaces that may include water soluble fertilizer granules wherein the mixture cures on the granule surface to form a non-tacky surface without a cooling step. The composition of the moisture barrier coatings of this invention comprise:
  a. at least one organic wax
  b at least one wax soluble polymer
  c. a thermoset polymer
wherein the weight ratio of organic wax to wax soluble polymer is from about 50:50 to about 98:2 and wherein the weight ratio of thermoset polymer to combined organic wax and wax soluble polymer is from about 50:50 to about 98:2, and wherein the organic wax and wax soluble polymer are mixed and dispersed into at least one component of the thermoset polymer before the thermoset polymer is applied to the surface and cured. The coating can comprise a semi-interpenetrating network of the wax, the wax soluble polymer, and the thermoset polymer.

The organic wax can be at least one selected from the group consisting of petroleum waxes, synthetic waxes, waxes, natural waxes, and hydrogenated triglycerides. The organic wax can be a paraffin.

The wax soluble polymer can be substantially non-reactive with the said thermoset polymer. The wax soluble polymer can form a homogeneous mixture with the said wax at 100° C. The wax soluble polymer can have a viscosity of less than 10,000 centipoise at 100° C. when at least 2 percent by weight is mixed with the said wax. The wax soluble polymer can be at least one selected from the group consisting of ethylene-vinyl acetate copolymers and terpolymers, modified polyolefins, acrylate ester polymers and copolymers, and tackifying resins.

The thermoset polymer can be at least one selected from the group consisting of polyurethanes, polyepoxides, and alkyd resins. The thermoset polymer can be a polyurethane. The thermoset polymer can be is a polyepoxide.

The moisture barrier coating can comprise at least one crystal growth modifier chosen from the group consisting of oxidized polyethylene waxes and ethylene copolymers with acrylic acid. The crystal growth modifier can be added at from about 0.5 to about 10 percent by weight of the mixture of the wax and wax soluble polymer.

A controlled release fertilizer can include a water soluble nutrient core coated with one or more moisture barrier coatings. At least one of the moisture barrier coatings can include:
  a. at least one organic wax;
  b. at least one polymer soluble in the wax;
  c. a thermoset polymer;
wherein the weight ratio of organic wax to wax soluble polymer is from about 50:50 to about 98:2 and wherein the weight ratio of thermoset polymer to combined organic wax and wax soluble polymer is from about 50:50 to about 98:2, and wherein the organic wax and wax soluble polymer are mixed and dispersed into at least one component of the thermoset polymer before the thermoset polymer is applied to the surface and cured, the coating comprising a semi-interpenetrating network of the wax, the wax soluble polymer, and the thermoset polymer. A sulfur coating can be applied to the nutrient core.

A method of producing a controlled release fertilizer can include the steps of:
  i. providing a quantity of fertilizer particles;
  ii. heating the fertilizer particles to a temperature above the melting point of the organic wax;
  iii. providing one or more moisture barrier coatings, at least one of said moisture barrier coatings comprising:
    a. at least one organic wax
    b. at least one wax soluble polymer
    c. a thermoset polymer
  wherein the weight ratio of organic wax to wax soluble polymer is from about 50:50 to about 98:2 and wherein the weight ratio of thermoset polymer to combined organic wax and wax soluble polymer is from about 50:50 to about 98:2;
  iv. mixing the organic wax and wax soluble polymer to provide a mixture
  v. dispersing the mixture into at least one component of the thermoset polymer to provide a dispersion;
  vi. applying the dispersion to the fertilizer particles while providing mixing sufficient to spread the dispersion as a coating on the fertilizer particles, and
  vii. curing the thermoset polymer on the surface of the particles to form free flowing coated granules.

A second component of the thermoset polymer can be applied after the application of the dispersion in Step vi. A second component of the thermoset polymer can be included in the dispersion of Step v. prior to application of the dispersion to the fertilizer particles in Step vi.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
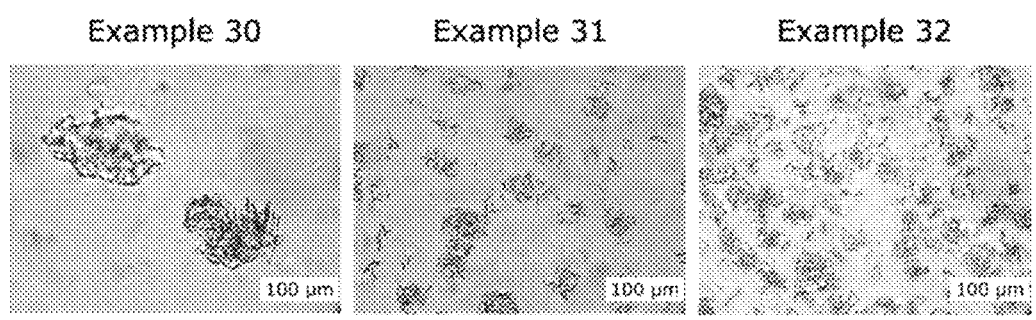
FIG. 1 is a magnified (100 μm scale) image of the products of Examples 30-32.

Interpenetrating polymer networks (IPN's) are historically defined as a combination of two or more polymers in network form that are synthesized in juxtaposition. IPN's are described in a review article by L. H. Sperling in Interpenetrating Polymer Networks, Klempner, et al Ed. Advances in Chemistry; American Chemical Society: Washington, D C, 1994, incorporated herein by reference. Semi-interpenetrating polymer networks (semi-IPNs) are related to IPN's and are defined herein as compositions in which one or more polymers are cross-linked and one or more wax soluble polymers are linear or branched. They are characterized as two phase systems in which the linear or branched wax soluble polymer is dispersed throughout, typically as submicron sized domains and without being substantially chemically bonded to, the crosslinked thermoset polymer.

Without being bound by theory it is believed that the compositions, production methods, and application methods disclosed herein may produce semi-IPN's that are networks of wax soluble linear or branched polymers domains in a crosslinked thermoset polymer, wherein an organic wax is used to facilitate the dispersion of wax soluble polymer into one or more components of the thermoset polymer before crosslinking the thermoset polymer and forming the semi-IPN. The wax may also provide hydrophobicity and improved moisture barrier properties. It is believed that the wax soluble polymers of the invention, when incorporated into the crosslinked thermoset polymer provide enhanced adhesion to the substrates and may also provide improved tensile strength and plasticity without being chemically bonded to the thermoset resin, and the resulting coatings have superior moisture barrier performance and handling characteristics.

In one aspect of the invention a wax soluble polymer is incorporated into an organic wax, and the wax-polymer mixture is dispersed as small particles into an isocyanate reactive polyol. The polyol containing the dispersed wax-polymer mixture is mixed with an isocyanate curing agent and applied to a surface. The polyol and isocyanate curing agent react to form a crosslinked urethane on the surface, which may result in the formation of a semi-IPN in which the polyurethane provides the crosslinked polymer into which the wax soluble polymer, which is a linear or branched polymer, is intimately dispersed. The wax is used as a carrier to disperse the wax soluble polymer into the polyol and enhance the moisture barrier properties of the coating.

In another aspect of the invention, a wax soluble polymer is incorporated into an organic wax, and the wax-polymer mixture is dispersed either as a small particle suspension or as a homogeneous mixture into an amine functional epoxy curing agent. The suspension or mixture produced is mixed with a glycidyl ether functional epoxy resin and applied to a surface wherein the curing agent and epoxy resin react to form a crosslinked epoxy polymer. This may result in the formation of a semi-IPN in which the epoxy polymer provides the crosslinked polymer into which the wax soluble polymer is intimately dispersed. The wax is used as a carrier to disperse the wax soluble polymer into the amine curing agent and enhance the moisture barrier properties of the coating.

In another aspect of the invention a wax soluble polymer is incorporated into an organic wax, and the wax-polymer mixture is dispersed either as small particles or as a homogeneous mixture into an alkyd resin. The resulting suspension or mixture is mixed with an appropriate crosslinking catalyst and applied to a surface, which may result in the formation of a semi-IPN in which the crosslinked alkyd resin provides the crosslinked polymer into which the wax soluble polymer is intimately dispersed. The wax is used as a carrier to disperse the wax soluble polymer into the alkyd resin and enhance the moisture barrier properties of the coating.

The wax soluble polymer resins are chosen from linear or branched polymers that form homogeneous low viscosity mixtures with waxes at temperatures of 100 degrees C. or lower. The viscosities of suitable polymer wax mixtures at 100 degrees C. are less than about 10,000 centipoise and preferably less than about 2500 centipoise and most preferably less than about 1000 centipoise. Suitable wax soluble polymers include but are not limited to:

a. Ethylene vinyl acetate copolymers and terpolymers (EVA's) with from about 10 to about 40 percent vinyl acetate and melt indexes by ASTM D1238 of greater than about 2. Suitable EVA's are sold by DuPont (Wilmington, Del.) as Elvax® and Bynel® resins. Other suitable EVA's are Evatane® and Orevac® resins sold by Arkema (Colombes, FR) and Escorene® resins sold by Exxon Mobil (Edison, N.J.). Preferred EVA's are terpolymers with a minor amount of a comonomer that has carboxylic acid functionality. Examples of carboxylic acid functional comonomers include acrylic acid, methacrylic acid, maleic acid, and maleic anhydride.

b. Ethylene alkyl acrylate and methacrylate copolymers and terpolymers with melt indexes by ASTM D1238 of greater than about 2. Suitable alkyl acrylate and methacrylate comonomers comprise esters with branched and straight chain alkyl groups with 1 to about 10 carbon atoms. Commercially available are for example copolymers with methyl acrylate, ethyl acrylate, butyl acrylate and 2-ethylhexyl acrylate. Ethylene butyl acrylate copolymers of this invention are sold by Exxon Mobil as Escorez® and EnBA® resins. Dupont sells suitable methyl, ethyl and butyl acrylate copolymers of ethylene as Elvaloy® resins. Arkema sells suitable methyl and butyl and 2-ethyl hexyl acrylate copolymers of ethylene as Lotryl® resins. Exxon Mobil sells suitable ethylene methyl acrylate copolymers as Optema® resins. Terpolymers with a minor amount of a comonomer that has carboxylic acid functionality are suitable. Examples of carboxylic acid functional comonomers include acrylic acid, methacrylic acid, maleic acid, and maleic anhydride. Arkema sells ethylene alkyl acrylate maleic anhydride terpolymers as Lotader® resins. The alkyl acrylates in the Lotader® resins are methyl, ethyl and butyl acrylates. Dupont sells ethylene acrylate terpolymers modified with maleic anhydride or acrylic acid as Bynel® resins.

c. Modified polyolefins. Suitable products include oxidized polyethylene, and copolymers of olefins with acrylic acid, methacrylic acid, maleic acid or maleic anhydride. Suitable oxidized polyethylenes are available for example from Honeywell (Morris Plains N.J.) as A-C® 6702, from Baker Hughes (Houston Tex.) as Cardis® 36, and from Marcus Oil and Chemical (Houston, Tex.) as Marcus P3300, 3400 and 3500. Suitable olefin copolymers include A-C® 520, A-C® 540, A-C® 580 and A-C® 5120 which are ethylene acrylic acid copolymers from Honeywell, and Nucrel® polymer resins which are ethylene methacrylic acid or acrylic acid copolymers available from Dupont. Suitable maleinized polybutadienes are available as Ricon® and Ricobond® resins from Cray Valley (Exton Pa.). Suitable polyisobutylene maleic anhydride copolymers are available from Vertellus (Middlesbrough UK) as PIBSA, and from Dover Chemicals (Dover Ohio) as Dovermulse®.

d. Tackifying resins. Tackifiers are typically resins, such as rosins and their derivatives, terpenes and modified terpenes, and aliphatic, cycloaliphatic and aromatic resins and their derivatives. Suitable tackifying resins include but are not limited to rosin esters available from Eastman Chemical Company (Kingsport Tenn.) as Permalyns®, and from Arizona Chemical Company (Jacksonville Fla.) as Sylvatac® resins; polyterpene resins sold by Arizona Chemical as Sylvarez®; and hydrocarbon resins sold by Cray Valley as Wingtack® and Norsolene® resins, by Rezkem (Hudson Ohio) as Arotac® and Alphatac® resins and by Neville Chemical Company (Pittsburgh Pa.) as Nevtac®, Nevex® and Nevchem® resins.

The wax soluble polymers of this invention are incorporated into molten organic waxes to form homogeneous, essentially newtonian mixtures. The organic waxes are chosen from natural and synthetic sources. Suitable waxes include insect and animal waxes such as beeswax; vegetable waxes such as candililla, carnauba, japan wax, ouricury waxes, rice-bran wax, jojoba, and castor wax; mineral waxes such as montan wax, peat waxes, ozokerite and ceresin waxes; petroleum waxes such as paraffin wax, microcrystalline wax, semicrystalline wax and slack wax; synthetic waxes such as polyethylene wax, Fischer-Tropsch waxes; and hydrogenated triglyceride waxes such as hydrogenated tallow and hydrogenated vegetable oils. Preferred waxes have melting points between about 40 degrees C. and 100 degrees C.

The thermoset polymers are chosen from one or two component polymeric materials that cure to cohesive non-tacky highly crosslinked compositions under the conditions of the coating applications of this invention.

In one aspect of the invention the thermoset polymer is comprised of polyurethanes comprised of the reaction product of an isocyanate reactive polyol and a polyisocyanate.

The choice of isocyanate reactive polyol is not particularly restricted and one skilled in the art will recognize suitable polyols. Non-limiting examples include polyols with a hydroxyl terminated backbone selected from the group comprising polyether, polyester, polycarbonate, polydiene, and polycaprolactone. Other suitable polyols are derived from vegetable oil glycerides. Additional suitable polyols are castor oil and hydrogenated castor oil. Polyols derived from cashew nutshell liquid are also suitable. The preferred polyols are polyether polyols comprising about 2 to 3 terminal hydroxyl groups, wherein the molecular weights are from about 400 to about 4000. These polyols are sold for example by BASF (Ludwigshafen, GDR) as Pluracol® polyols, by Monument Chemicals (Indianapolis Ind.) as Poly G® polyols, and by Carpenter Co. (Richmond, Va.) as Carpol® polyols.

The choice of polyisocyanate is not particularly restricted and one skilled in the art will recognize suitable polyisocyanates. Suitable commercially available polyisocyanates include toluene disocyanate sold as Mondur® TD, TDS, and TD-80 by Mobay Corporation (Pittsburgh Pa.), as Vonanite® T-80 by Dow Chemical Company (Midland Mich.), and as Lupranate® TDI by BASF Corp. Pure and modified diphenylmethylene diisocyanates are sold as Mondur® M by Mobay Corporation, and as Isonate® 125M, 143L, 181 and 2240 by Dow Chemical Company. Polymeric diphenylmethane diisocyanates are sold as PAPI® 27, 94, 135 and 901 by Dow Chemical Company, as Mondur® MR and MRS by Mobay Corporation, and as Lupranate® M10 and M20 by BASF Corp. Suitable polyisocyanates may contain a polyurethane segment, commonly known as a prepolymer. Preferred polyisocyanates are polymeric diphenylmethane diisocyanates.

In another aspect of the invention the thermoset polymer is comprised of polyepoxides comprised of the reaction product of glycidyl ether reactive amine containing curing agents and polyglycidyl ether epoxide resins.

The choice of glycidyl ether reactive amine containing curing agent is not particularly restrictive and one skilled in the art will recognize suitable curing agents. Suitable commercially available curing agents include polyamines and modified polyamines sold by BASF as Versamines®, by Huntsman Corporation (Salt Lake City Utah) as Jeffamines® and Aradurs®, and by Reichhold Chemical (Durham N.C.) as Epotufs®. Amidoamine curing agents are also suitable. Amidoamine curing agents are sold by BASF as Genamids®, By Gabriel Performance Products (Ashtabula, Ohio) as Versamids®, by Reichhold as Epotufs® and by Huntsman as Aradurs®.

The choice of polyglycidyl ether epoxide resin is not particularly restrictive and one skilled in the art will recognize suitable resins. Suitable commercially available resins include Epon® resins sold by Momentive Performance Products (Waterford N.Y.), Epotuf® resins sold by Reichhold, and Araldite® resins sold by Huntsman. Polyglycidyl ether epoxides based on bisphenol A diglycidyl ether are readily available and highly suitable.

In another aspect of the invention the thermoset polymer is comprised of alkyd resins comprised of an unsaturated vegetable oil based alkyd resins crosslinked with a suitable catalyst.

The choice of the alkyd resins is not particularly restrictive and one skilled in the art will recognize suitable resins. Commercially available resins are polyesters that are reaction products of unsaturated vegetable oils including but not limited to linseed oil and soybean oil with a polycarboxylic acid and a polyglycol, typically mixed with excess vegetable oil. Suitable resins are sold by Reichhold Chemical Company as Beckosol® resins, by Synres (Hoek van Holland Neth.) as Urakyds®, by Sunpol Resins and Polymers (Fairfield Calif.) as Sunpol® resins, and by Mobile Rosin Company (Mobile Ala.) as A MR resins. To minimize or eliminate solvents in the alkyd resins, long oil alkyds with oil content of greater than 70 percent by weight, which generally have lower viscosity, are preferred.

The choice of crosslinking catalysts is not particularly restrictive and one skilled in the art will recognize suitable catalysts. Suitable catalysts include but are not limited to metal carboxylate salts and complexes. Preferred catalysts are transition metal carboxylate salts and complexes. Commercially available catalysts are sold by Dura Chemicals (Emeryville Calif.) as Durocts® and DriCAT®, and by OMG Borchers (Langenfeld GDR) under the tradenames Borchi®, Borcher®, Soligen®, and PolyCure®. The crosslinking reaction may be further accelerated with accelerants, which are typically aromatic amines.

The wax soluble straight chain or branched polymers of this invention are dispersed into the organic waxes of this invention to form homogeneous wax-polymer mixtures by any suitable means. Typically the wax is heated to above its melting point and preferably it is heated to a temperature at or above the glass transition temperature of the polymer if the glass transition temperature of the polymer is higher than the wax melting point, to expedite the incorporation of the polymer into the molten wax. The polymer, which may be in form of particles such as pellets or flakes, or may be in the form of a viscous liquid is added to the molten wax with sufficient agitation to effect its dissolution into the wax. The use of high shear mixing may expedite the dissolution. In one aspect of the invention the wax-polymer mixtures may be in the form of wax like materials with melting points of from about 40 degrees C. to about 100 degrees C. In another aspect of the invention the wax-polymer mixtures may have melting points below 40 degrees C., for example 30 degrees C. or 20 degrees centigrade, and may be in the form of homogeneous viscous liquids at ambient conditions. The viscosity of suitable polymer wax mixtures at 100 degrees C. are less than about 10,000 centipoise and preferably less than about 2500 centipoise and most preferably less than about 1000 centipoise.

The wax-polymer mixtures are dispersed into one or more components of the thermoset polymers by any suitable means. In one aspect of the invention the wax-polymer mixture may be added to the thermoset polymer component at a temperature above the melting point of the wax-polymer mixture to form a homogeneous mixture with the component. In another aspect of this invention, the wax-polymer mixture may be added to the thermoset polymer component at a temperature above the melting point of the wax-polymer mixture to form a dispersion of two liquid phases. This two phase dispersion may be cooled with high shear mixing to below the melting point of the wax-polymer mixture to form a stable two phase suspension of the solid wax-polymer mixture in the thermoset polymer component.

To decrease the size and improve the uniformity of the suspended wax-polymer particles, the dispersion may be homogenized by methods known in the art. The homogenized dispersions may be further improved by the addition of one or more crystal growth modifiers, the choice of which is not particularly restrictive. Oxidized polyethylene waxes, such as Marcus® 3500 (Marcus Oil and Chemical, Houston, Tex.) and A-C® 6702 (Honeywell International) are highly suitable. Copolymers of ethylene and acrylic acid are also suitable. The crystal growth modifiers are added at levels of from about 0.5 percent to about 10 percent by weight of the wax-polymer particles. To improve the flow properties of the homogenized dispersions viscosity modifying agents may be added, the choice of which is not particularly restrictive. Low molecular weight glycols and glycol ethers are effective, and propylene glycol is particularly suitable. The viscosity modifying agents are added at from about 1 percent to about 10 percent by weight to the suspension of the wax-polymer in the thermoset polymer component.

The moisture barrier coatings of this invention may be applied to any substrate where such a coating may be beneficial. In one aspect of this invention the coatings are applied to commercial particulate fertilizer particles to provide a controlled release benefit.

Commercial particulate fertilizers are produced and marketed in several different particle types, i.e., granular, pelletized and prilled fertilizers. Also they may be formed of inorganic substances, organic substances, or combinations thereof. The moisture barrier coatings of this invention can be applied to any of these. To be effective in promoting plant growth, fertilizers must contain some amount of water soluble plant nutrients, typically in the form of water soluble compounds of nitrogen, phosphorus and potassium, alone or in combination and often in conjunction with other elements, e.g., calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated 6-6-6, 4-6-4, 10-10-10, 20-20-5, 14-16-0, 5-20-20, and the like. In addition, specialized fertilizers may contain optional additives such as herbicides, insecticides, trace elements, iron salts, etc. The coatings of this invention can be applied to any of these.

In one aspect of the invention the coatings can be applied directly to the substrate. In another aspect of the invention the coatings can be applied over a thermoset polymer coating that can be a polyurethane, an epoxy resin, an alkyd resin or other thermoset coating. In another aspect of the invention the coating can be applied over a sulfur coating.

In one mode of carrying out the invention the wax-polymer mixture is dispersed into an isocyanate reactive polyol to form a small particle suspension. Fertilizer particles are preheated to a temperature above the melting point of the wax-polymer mixture and typically to about 50 to 90 degrees C., in a mixing device that provides thorough low shear agitation. The polyol with dispersed organic wax and wax soluble polymer is applied to the fertilizer granules and the mixing action facilitates spreading the mixture uniformly onto the granules. When a uniform distribution is achieved, a polyisocyanate component is added such that the ratio of hydroxyl functionality on the polyol and the isocyanate moieties is between about 0.5 to 1 and 1 to 1. The polyisocyanate is allowed to spread and react with the polyol, forming a polyurethane that incorporates the organic wax and the wax soluble polymer into the thermoset polyurethane polymer and may form a semi-IPN. The addition of the polyol with the dispersed wax-polymer and the isocyanate can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. Typically the coating completely covers the surfaces of the fertilizer particles. Typically the total coating thickness is from about 5 to about 500 microns. The resulting coated fertilizer particles are free flowing and non-tacky at the reaction temperature, and remain free flowing when discharged without a cooling step to storage, for example to a pile or a bin.

In another mode of carrying out the invention the wax-polymer mixture is dispersed into an isocyanate reactive polyol to form a small particle suspension. Fertilizer particles are preheated to a temperature above the melting point of the wax-polymer mixture and typically to about 50 to 90 degrees C., in a mixing device that provides thorough low shear agitation. The polyol with dispersed wax-polymer is mixed with a polyisocyanate component such that the ratio of hydroxyl functionality on the polyol and the isocyanate moieties is between about 0.5 to 1 and 1 to 1. The mix of dispersed wax-polymer mixture in polyol and polyisocyanate is immediately added to the fertilizer granules and the mixing action facilitates spreading the mixture uniformly onto the granules. The polyisocyanate reacts with the polyol, forming a polyurethane that incorporates the organic wax and the wax soluble polymer into the thermoset polyurethane polymer and may form a semi-IPN. The addition of the mixture of the polyol with the dispersed wax-polymer and the isocyanate can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. Typically the coating completely covers the surfaces of the fertilizer particles. Typically the total coating thickness is from about 5 to about 500 microns. The resulting coated fertilizer particles are free flowing and non-tacky at the reaction temperature, and remain free flowing when discharged without a cooling step to storage, eg in a pile or a bin.

In another mode of carrying out the invention, the wax-polymer modified polyurethane coating described above can be applied as a sealant layer over fertilizer granules previously coated with a thermoset polymer or with sulfur, or a combination of thermoset polymer and sulfur using either of the coating methods described above. The thermoset polymers can be any polymers that are commonly used in this application, including but not limited to polyurethanes, polyepoxides, alkyds, urea and melamine formaldehyde resins, and the like. When applied as a sealant layer over previously coated fertilizer granules, typically one application of from about 0.25 percent to about 3 percent of the polymer-wax modified polyurethane sealant is applied. Typically the coating completely covers the surfaces of the fertilizer particles. Typically the total coating thickness is from about 5 to about 200 microns.

In another mode of carrying out the invention the wax-polymer mixture is dispersed into a glycidyl ether reactive polyamine, either as a small particle dispersion or as a homogeneous mixture. Fertilizer particles are preheated to a temperature above the melting point of the wax-polymer mixture and typically to about 50 to 90 degrees C., in a mixing device that provides thorough low shear agitation. The polyamine with dispersed wax-polymer is applied to the fertilizer granules and the mixing action facilitates spreading the mixture uniformly onto the granules. When a uniform distribution is achieved, a polyglycidyl component is added such that the ratio N—H functionality on the polyamine and the glycidyl ether moieties is between about 0.8 to 1 and 1.2 to 1, and preferably about 1 to 1. The polyglycidyl ether is allowed to spread and react with the polyamine forming a polyepoxide that incorporates the organic wax and the wax soluble polymer into the thermoset polyepoxide polymer and may form a semi-IPN. The addition of the polyamine with the dispersed wax-polymer and the polyglycidyl ether can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. Typically the coating completely covers the surfaces of the fertilizer particles. Typically the total coating thickness is from about 5 to about 500 microns. The resulting coated fertilizer particles are free flowing and non-tacky at the reaction temperature, and remain free flowing when discharged without a cooling step to storage, eg in a pile or a bin.

In still another mode of carrying out the invention, the wax-polymer mixture is dispersed into a glycidyl ether reactive polyamine, either as a small soluble dispersion or as a homogeneous mixture. Fertilizer particles are preheated to a temperature above the melting point of the wax-polymer mixture and typically to about 50 to 90 degrees C., in a mixing device that provides thorough low shear agitation. The polyamine with dispersed wax-polymer is mixed with a polyglycidyl ether component such that the ratio of N—H functionality on the polyamine and the glycidyl ether moieties is between about 0.8 to 1 and 1.2 to 1, and preferably about 1 to 1. The mix of dispersed wax-polymer mixture in polyamine and polyglycidyl ether is immediately added to the fertilizer granules and the mixing action facilitates spreading the mixture uniformly onto the granules. The polyglycidyl ether reacts with the polyamine, forming a polyepoxide that incorporates the organic wax and the wax soluble polymer into the thermoset polyepoxide polymer and may form a semi-IPN. The addition of mixture of the polyamine with the dispersed wax-polymer and the polyglycidyl ether can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. Typically the coating completely covers the surfaces of the fertilizer particles. Typically the total coating thickness is from about 5 to about 500 microns. The resulting coated fertilizer particles are free flowing and non-tacky at the reaction temperature, and remain free flowing when discharged without a cooling step to storage, e.g. in a pile or a bin.

In another mode of carrying out the invention, the organic wax and wax soluble polymer modified polyepoxide coating described above can be applied as a sealant layer over fertilizer granules previously coated with a thermoset polymer or with sulfur, or a combination of thermoset polymer and sulfur using either of the coating methods described above. The thermoset polymers can be any polymers that are commonly used in this application, including but not limited to polyurethanes, polyepoxides, alkyds, urea and melamine formaldehyde resins, and the like. When applied as a sealant layer over previously coated fertilizer granules, typically one application of from about 0.25 percent to about 3 percent of the polymer-wax modified polyepoxide sealant is applied. Typically the coating completely covers the surfaces of the fertilizer particles. Typically the total coating thickness is from about 5 to about 200 microns.

In another mode of carrying out the invention the organic wax and wax soluble polymer mixture is dispersed into an alkyd resin, either as a small particle dispersion or as a homogeneous mixture. Fertilizer particles are preheated to a temperature above the melting point of the wax-polymer mixture and typically to about 50 to 90 degrees C., in a mixing device that provides thorough low shear agitation. A curing catalyst is added to the alkyd resin with dispersed wax-polymer. The mixture is immediately applied to the fertilizer granules and the mixing action facilitates spreading the mixture uniformly onto the granules. The alkyd resin cures on the surface of the fertilizer granules. The organic wax and the wax soluble polymer is incorporated into the cured alkyd resin and may form a semi-IPN. The addition of the alkyd with the dispersed wax-polymer and catalyst can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. Typically the coating completely covers the surfaces of the fertilizer particles. Typically the total coating thickness is from about 5 to about 500 microns. The resulting coated fertilizer particles are free flowing and non-tacky at the reaction temperature, and remain free flowing when discharged without a cooling step to storage, e.g. in a pile or a bin.

In another mode of carrying out the invention, the organic wax and wax soluble polymer modified alkyd resin coating described above can be applied as a sealant layer over fertilizer granules previously coated with a thermoset polymer or with sulfur, or a combination of thermoset polymer and sulfur using either of the coating methods described above. The thermoset polymers can be any polymers that are commonly used in this application, including but not limited to polyurethanes, polyepoxides, alkyds, urea and melamine formaldehyde resins, and the like. When applied as a sealant layer over previously coated fertilizer granules, typically one application of from about 0.25 percent to about 3 percent of the wax-polymer modified alkyd sealant is applied. Typically the coating completely covers the surfaces of the fertilizer particles. Typically the total coating thickness is from about 5 to about 200 microns.

The relative amounts of the constituents of the invention can vary. The weight ratio of wax to wax soluble polymer can be 50:50, 51:49, 52:48, 53:47, 54:46, 55:45, 56:44, 57:43, 58:42, 59:41, 60:40, 61:39, 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, 90:10, 91:9, 92:8, 93:7, 94:6, 95:5, 96:4, 97:3, 98:2, or within a range of any high and low value of these ratios.

The weight ratio of thermoset polymer to combined organic wax and wax soluble polymer can be 50:50, 51:49, 52:48, 53:47, 54:46, 55:45, 56:44, 57:43, 58:42, 59:41, 60:40, 61:39, 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, 90:10, 91:9, 92:8, 93:7, 94:6, 95:5, 96:4, 97:3, 98:2, or within a range of any high and low value of these ratios.

The following examples further illustrate the invention. As used herein all parts or percentages are by weight of the entire composition unless otherwise indicated.

In the examples the following materials are used:

Pluracol® P410R Polypropylene glycol diol MW approx. 530, from BASF

Pluracol® GP-430 Glycerol based polypropylene triol MW approx. 423, from BASF

Lupranate® M20 Polyaromatic isocyanate, 31.5% NCO, 2.7 functionality, from BASF

Parvan® 1580 Fully refined paraffin, MP 70 degrees C. from Exxon Mobil

Elvax® 4320 Ethylene vinyl acetate terpolymer containing 25 percent vinyl acetate and 1 percent methacrylic acid, melt index 150, from DuPont Elvax® 4310 Ethylene vinyl acetate terpolymer containing 25 percent vinyl acetate and 1 percent methacrylic acid, melt index 500, from DuPont Elvax® 420 Ethylene vinyl acetate copolymer containing 18 percent vinyl acetate, melt index 150 from DuPont.

Elvax® 260 Ethylene vinyl acetate copolymer with 28 percent vinyl acetate, melt index 6, from DuPont Versamid® V-140 Amine amide epoxy curing agent from Gabriel Performance Products Epotuf® 37-139 Bisphenol-A diglycidyl ether, epoxide equivalent weight 190, from Reichhold Chemical Company Polycat® 9 Tertiary amine catalyst from Air Products and Chemicals (Allentown Pa.)

A-C® 5120 Ethylene acrylic acid copolymer from Honeywell

Beckosol® 1272 Solvent free soybean oil based alkyd resin from Reichhold Chemical Company Marcus® 3500 Oxidized polyethylene, Acid Number 24, from Marcus Oil and Chemical

EXAMPLE 1 (COMPARATIVE)

972 g of +10 mesh urea granules were charged to a drum mixer and heated to 77° C. 8.5 g of Pluracol® P410R were added with mixing. When the granules were evenly coated 5.4 g of Lupranate® M20 were added and mixing continued for 11 minutes at which point the urethane polymer had cured and the granules were free flowing. The Pluracol® P410 and Lupranate® M20 additions were repeated and cured to form 2 coats. The coating weight was 2.8 percent of the total coated urea.

EXAMPLE 2 (COMPARATIVE)

972 g of +10 mesh urea granules were charged to a drum mixer and heated to 77° C. 7.2 g of Pluracol® GP-430 were added with mixing. When the granules were evenly coated 6.8 g of Lupranate® M20 were added and mixing continued for 3 minutes at which point the urethane polymer had cured and the granules were free flowing. The Pluracol® GP-430 and Lupranate® M20 additions were repeated and cured to form 2 coats. The coating weight was 2.8 percent of the total coated urea.

EXAMPLE 3 (COMPARATIVE)

972 g of +10 mesh urea granules were charged to a drum mixer and heated to 77° C. 6.4 g of Pluracol® P410R were added with mixing. When the granules were evenly coated 7.5 g of Lupranate® M20 were added and mixing continued for 15 minutes at which point the urethane polymer had cured and the granules were free flowing. The Pluracol® P410R and Lupranate® M20 additions were repeated and cured to form 2 coats. The coating weight was 2.8 percent of the total coated urea.

EXAMPLE 4 (COMPARATIVE)

199 g of the polyurethane coated urea granules of Example 3 were heated to 80° C. and 1 g (0.5 percent by weight) of blend of 46 percent by weight Pluracol® P410R and 54 percent by weight Lupranate® M20 was added and distributed on the surface of the granules and mixed for 10 minutes at which point the granules became free flowing.

EXAMPLE 5

5 g of a mixture of 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the wax and polymer in the polyol.

199 g of the polyurethane coated urea granules of Example 3 were heated to 80° C. and 1 g (0.5 percent by weight) of a reactive sealant mixture containing 52 percent by weight of the polyol-wax-polymer suspension above and 48 percent by weight Lupranate® M20 was added and distributed on the surface of the granules using low shear mixing. After 20 minutes the granules were free flowing, and could be cooled without agitation to a free flowing state.

To determine the controlled release properties of the coated urea products of Examples 3, 4, and 5, 40 g of the coated products were dispersed in 200 g of water and stored at 39° C. for 7 days. The urea that had released from the granules was determined by quantifying the urea in the water phase by refractive index. The results are shown in Table 1:

TABLE 1

| Example | Sealant | % urea released in 7 days at 39° C. |
| --- | --- | --- |
| 3 (comparative) | none | 80 |
| 4 (comparative) | 0.5% Polyurethane | 57 |
| 5 | 0.5% Dispersion of wax and polymer in polyurethane | 17 |

EXAMPLE 6 (COMPARATIVE)

985 g of +10 mesh urea granules were charged to a drum mixer and heated to 75 to 80° C. 15 g of a mix containing 37.4 percent by weight Versamid® 140, 60.8 percent by weight Epotuf® 37-139 and 2 percent by weight Polycat® 9 were added and spread onto the granule surfaces. After 10 minutes the epoxide had cured and the granules were free flowing. The coating was 1.5 percent by weight of the coated urea granule.

EXAMPLE 7

5 g of a mixture of 90 percent by weight Parvan® 1580, 2 percent by weight Elvax® 4320, and 8 percent by weight Elvax® 260 was mixed at 75° C. with 18.6 g of a mixture of 95 percent by weight Versamid® 140 and 5 percent by weight Polycat® 9 to form a homogeneous mixture. 4.5 g of the wax-polymer-Versamid® mix was cooled to 25 degrees C. and mixed with 5.5 g of Epotuf® 37-139.

198 g of the epoxy coated urea of Example 6 was heated to 80° C. and 2 g (1 percent by weight) of the above reactive sealant mix of uncured epoxide, wax, and polymer was added to the heated granules and allowed to spread uniformly on the surface of the granules. After 10 minutes the coated granules were free flowing and could be cooled without agitation to a free flowing state.

EXAMPLE 8

5 g of a mixture of 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the wax and polymer in the polyol.

198 g of the epoxide coated urea granules of Example 6 were heated to 80° C. and 2 g (1 percent by weight) of a reactive sealant mixture containing 52 percent by weight of the polyol-wax-polymer suspension above and 48 percent by weight Lupranate® M20 was added and distributed on the surface of the granules using low shear mixing. After 11 minutes the granules were free flowing, and could be cooled without agitation to a free flowing state.

The controlled release properties of the compositions of Examples 6, 7, and 8, were determined as in Example 5. The results are shown in Table 2

TABLE 2

| Example | Sealant | % urea released in 7 days at 39° C. |
|---|---|---|
| 6 (comparative) | none | 100 |
| 7 | 1% Dispersion of wax and polymer in polyepoxide | 30 |
| 8 | 1% Dispersion of wax and polymer in polyurethane | 15 |

EXAMPLES 9-14

Wax polymer mixtures were prepared from Parvan® 1580 by adding levels of 0, 5, 10, 20, 40, and 50 percent by weight of the wax-polymer mixture of Elvax® 4320 and mixing at 110 to 120° C. until uniform.

6.36 g of each of the wax polymer mixtures were dispersed into 23.64 g of Pluracol® 410R by heating the mixture to 110° C. and cooling with high shear mixing, to form dispersions of the polymer and wax mixtures in the polyol.

The reactive sealant compositions were prepared by mixing 4.78 g of the polyol-wax-polymer dispersion with 4.42 g of Lupranate® M20, immediately before applying to the urethane coated granules.

For each coating, 199 g of the urethane coated urea of Example 1 was heated to 80° C. and 1 g of the reactive sealant compositions was distributed on the surface of the granules and mixed for 20 minutes, at which point the granules were free flowing, and could be cooled without agitation to a free flowing state.

The controlled release properties of the compositions of Examples 1, 9, 10, 11, 12, 13, and 14 were determined as in Example 5. The results are shown in Table 3.

TABLE 3

| Example | Sealant | % urea released in 7 days at 39° C. |
|---|---|---|
| 1 (Comparative) | None | 100 |
| 9 (Comparative) | 0.5% Dispersion of wax in urethane with no polymer | 95 |
| 10 | 0.5% Dispersion of wax in urethane with 5% polymer | 60 |
| 11 | 0.5% Dispersion of wax in urethane with 10% polymer | 35 |
| 12 | 0.5% Dispersion of wax in urethane with 20% polymer | 69 |
| 13 | 0.5% Dispersion of wax in urethane with 40% polymer | 71 |
| 14 | 0.5% Dispersion of wax in urethane with 50% polymer | 88 |

EXAMPLE 15

A dispersion of a polymer wax mixture in a urethane composition was applied directly to urea granules without an initial thermoset polymer coating.

5 g of a wax polymer mixture containing 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the wax and polymer in the polyol.

197.2 g of +10 mesh urea granules of were heated to 80° C. and 2.8 g of a mixture containing 52 percent by weight of the polyol-wax-polymer suspension above and 48 percent by weight Lupranate® M20 was added and distributed on the surface of the granules using low shear mixing. After 10 minutes the granules were free flowing, and could be cooled without agitation to a free flowing state. The coating was 1.4 percent by weight of the total composition.

EXAMPLE 16

Example 15 was repeated and an additional 1.4 percent by weight coating of the wax-polymer dispersion in urethane was applied for a total coating of 2.8 percent by weight of the total composition.

EXAMPLE 17

Example 15 was repeated and two additional 1.4 percent by weight coatings of the wax-polymer dispersion in urethane was applied for a total coating of 4.2 percent by weight of the total composition. After the final coating was applied, the coated granules required low shear agitation during a cooling step to become free flowing.

The controlled release properties of the compositions of Examples 15, 16, and 17 were determined as in Example 5, and compared to the controlled release properties of Example 5, a composition wherein wax-polymer dispersions in urethane are applied over a polyurethane coating. The results are shown in Table 4.

TABLE 4

| Example | Coating | % urea released in 7 days at 39 C. |
|---|---|---|
| 5 | Reactive sealant applied over a polyurethane coating on urea, 4.3% total coating | 17 |

TABLE 4-continued

| Example | Coating | % urea released in 7 days at 39 C. |
|---|---|---|
| 15 | Reactive coating applied to urea, 1 x 1.4% coating | 100 |
| 16 | Reactive coating applied to urea, 2 x 1.4% coating, 2.8% total | 50 |
| 17 | Reactive coating applied to urea, 3 x 1.4% coating, 4.2% total | 28 |

EXAMPLE 18

5 g of a polymer wax mixture containing 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the polymer and wax in the polyol.

191.9 g of +10 mesh urea granules were heated to 80 degrees C. and 1.7 g of the polyol-wax-polymer suspension above was added and spread on the urea granules. 1 g of Lupranate® M20 was added and mixing continued for 10 minutes at which point the granules were free flowing. Two more additions of the polyol-wax-polymer suspension and Lupranate were added and cured. The granules were free flowing, and could be cooled without agitation to a free flowing state. The coating was 4.1 percent by weight of the total composition.

EXAMPLE 19 (COMPARATIVE)

A composition was prepared with the same components as Example 18, but the wax polymer mixture was added and spread prior to the addition of the urethane components.

191.9 g of +10 mesh urea granules were heated to 80° C. and 0.36 g of a polymer wax mixture containing 5 percent by weight Elvax® 4320 and 95 percent by weight Parvan® 1580 was added and mixed to spread the wax on the urea granules. 1.36 g of Pluracol® 410 R was added and mixed to spread on the granules. 1 g of Lupranate® M20 was added and mixing continued for 10 minutes at which point the granules were free flowing. The additions of polymer wax mixture, polyol and Lupranate and curing steps were repeated 2 more times. The granules were free flowing, and could be cooled without agitation to a free flowing state. The coating was 4.1 percent by weight of the total composition.

EXAMPLE 20

5 g of a polymer wax mixture containing 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the wax polymer mixture in the polyol.

199 g of the polyurethane coated urea granules of Example 3 were heated to 80° C. and 1 g (0.5 percent by weight) of a reactive sealant mixture containing 52 percent by weight of the polyol-wax-polymer suspension above and 48 percent by weight Lupranate® M20 was added and distributed on the surface of the granules using low shear mixing. After 20 minutes the granules were free flowing, and could be cooled without agitation to a free flowing state.

EXAMPLE 21 (COMPARATIVE)

A composition was prepared with the same components as Example 20, but the wax polymer mixture was added and spread prior to the addition of the urethane components.

199 g of the polyurethane coated urea granules of Example 3 were heated to 80° C. and 0.11 g of a polymer wax mixture containing 5 percent by weight Elvax® 4320 and 95 percent by weight Parvan® 1580 was added and mixed to spread on the granules. 0.41 g of Pluracol P410R was added and spread on the granules, followed by 0.48 g of Lupranate® M20. When the coating had cured the additions of polymer wax mixture, polyol and Lupranate were repeated. After curing the granules were free flowing, and could be cooled without agitation to a free flowing state.

The controlled release properties of the compositions of Examples 18, 19, 20, and 21 were determined as above. The results are shown in Table 5

TABLE 5

| Example | Coating | % urea released in 7 days at 39° C. |
|---|---|---|
| 18 | Reactive coating applied to urea, polyol-wax-polymer suspension and Lupranate added sequentially | 40 |
| 19 (comparative) | Polymer wax mixture added before the polyurethane components. | 91 |
| 20 | Reactive sealant applied over polyurethane | 58 |
| 21 (comparative) | Sealant composition of Example 20, but polymer wax mixture added as a separate step prior to the polyurethane addition | 73 |

EXAMPLE 22

5 g of a polymer wax mixture containing 5 percent by weight Elvax 4320 and 95 percent by weight Parvan® 1580 was added to 18.6 g of Pluracol P410R. The mixture was heated to 80° C. to melt the wax, and the mixture was cooled to ambient with high shear mixing to form a flowable suspension of the polymer wax mixture in the polyol.

195.9 g of +10 mesh urea granules of were heated to 60 degrees C. and 1.36 g of a mixture containing 52 percent by weight of the polyol-wax-polymer suspension above and 48 percent by weight Lupranate® M20 was added and distributed on the surface of the granules using low shear mixing. After 10 minutes the granules were free flowing. Two additional 1.36 g additions of the wax-polymer dispersion in urethane were applied and cured for a total coating of 2.1 percent by weight of the total composition.

EXAMPLE 23

5 g of a polymer wax mixture containing 5 percent by weight Elvax® 4320 and 95 percent by weight Parvan® 1580 was added to 18.6 g of Pluracol® P410R. The mixture was heated to 80° C. to melt the wax, and the mixture was cooled to ambient with high shear mixing to form a flowable suspension of the polymer wax mixture in the polyol.

195.9 g of +10 mesh urea granules of were heated to 80 degrees C. and 1.36 g of a mixture containing 52 percent by weight of the polyol-wax-polymer suspension above and 48 percent by weight Lupranate® M20 was added and distributed on the surface of the granules using low shear mixing. After 10 minutes the granules were free flowing. Two additional 1.36 g additions of the wax-polymer dispersion in urethane were applied and cured for a total coating of 2.1 percent by weight of the total composition.

The controlled release properties of the compositions of Examples 22 and 23 were determined as above. The results are shown in Table 6

TABLE 6

| Example | Coating | % urea released in 7 days at 39° C. |
|---|---|---|
| 22 | Reactive coating applied to urea at 60° C. | 93 |
| 23 | Reactive coating applied to urea at 80° C. | 69 |

EXAMPLE 24

5 g of a polymer wax mixture containing 2.36 percent by weight A-C® 5120 and 97.64 percent by weight Parvan® 1580 was added to 18.6 g of Pluracol® P410R. The mixture was heated to 90° C. to melt the wax, and the mixture was cooled to ambient with high shear mixing to form a flowable suspension of the polymer wax mixture in the polyol.

191.9 g of +10 mesh urea granules of were heated to 80 degrees C. and 2.71 g of a mixture containing 52 percent by weight of the polyol-wax-polymer suspension above and 48 percent by weight Lupranate® M20 was added and distributed on the surface of the granules using low shear mixing. After 10 minutes the granules were free flowing. Two additional 2.71 g additions of the wax-polymer dispersion in urethane were applied and cured for a total coating of 4.1 percent by weight of the total composition.

The controlled release properties of the composition of Examples 24 were determined as in Example 5. 18 percent of the urea was released after 7 days at 39 C.

EXAMPLE 25

A moisture barrier coating based on an alkyd resin as the thermoset polymer was prepared and applied to urea. A mixture containing 78 percent by weight Beckosol 1272 and 22 percent by weight of a wax-polymer mixture containing 95 percent by weight Parvan 1580 and 5 percent by weight Elvax 4320 wax prepared by mixing at 80° C. to a uniform mixture, and cooling with agitation. The mixture was a high viscosity creamy suspension. Before the mixture was applied to urea a cobalt-zirconium catalyst was added.

192 g of +10 mesh urea granules were heated to 80° C. and 2.7 g of the catalyzed alkyd-wax-polymer mixture were applied to the granules and spread and cured with low shear agitation. The application and curing steps were repeated 2 more times to a total coating weight of 4 percent of the coated granules.

The controlled release properties of the composition of were determined as in Example 5. 88 percent of the urea was released after 7 days at 39 C. A comparative coating of the Beckosol 1272 with no wax-polymer additive released 100 percent in 2 days under the same conditions.

EXAMPLE 26

956 lb of a mixture of 5 percent by weight Elvax® 4320 and 95 percent by weight Parvan® 1580 was added to a clean stainless steel reactor with a capacity of approximately 800 gallons. The material was heated via internal steam coils to 235° F. over the course of 2.5 hours and circulated with a propeller agitator. 25 lb of Marcus® 3500 was added with continued mixing, and after a short time the mixture was a homogeneous semi-transparent liquid. 3680 lb of Pluracol P410R was slowly introduced over approximately 4 hours, a rate that allowed for the temperature of the mixture to remain above 180 degrees F. 245 pounds of propylene glycol was added. A homogeneous semi-transparent liquid resulted. The 180-185° F. mixture was processed through a Gaulin two-stage homogenizer, with the first stage maintaining approximately 2500 psi, and the second maintaining approximately 500 psi throughout processing. The material was passed through a chilled water heat exchanger, where it was cooled to 120-130° F., yielding a homogeneous white liquid suspension, and collected in IBC totes.

EXAMPLE 27

The polyol sealant composition of Example 26 was applied as a sealant to sulfur coated urea (SCU) with 13 percent by weight sulfur.

400 g of +10 mesh SCU granules were heated to 75-80° C. in a rotating drum. 2.53 g of the polyol sealant composition of Example 26 was added and allowed to spread, followed by 2.27 g of Lupranate® M-20. After 10 minutes the granules were free flowing. The total sealant was 1 percent by weight of the coated SCU granules.

EXAMPLE 28

The coating procedure of Example 27 was repeated using 3.8 g of the polyol sealant composition and 3.4 g of the Luprinate®) M-20. The total sealant was 1.5 percent by weight of the coated SCU granules.

EXAMPLE 29

The coating procedure of Example 28 was repeated except that the polyol sealant composition and the Luprinate® M-20 were premixed immediately before the addition to the SCU granules. The total sealant was 1.5 percent by weight of the coated SCU granules.

The sealed SCU granules of Examples 27, 28 and 29 were abraded by dropping 100 g through a 6 foot pipe to a stainless steel surface 5 times. The release rates of the abraded and unabraded granules were determined by the method of Example 5, and compared to the release from SCU granules sealed with a conventional wax sealant. The results are shown in Table 7.

TABLE 7

| Example | Sealant | % Release in one day Unabraded | % Release in one day abraded |
|---|---|---|---|
| 27 | 1% Reactive Sealant | 0.8% | 44% |
| 28 | 1.5% Reactive Sealant | 0% | |
| 29 | 1.5% Reactive Sealant, polyol and isocyanate premixed | 0% | 19% |
| Comparative | 2% Conventional Wax Sealant | 21% | 37% |

EXAMPLE 30

55.5 g of a mixture of 5 percent by weight Elvax® 4320 and 95 percent by weight Parvan® 1580 was added to 497.9 g of Pluracol® P410R. The mixture was heated to 84° C. to melt the wax, and the mixture was cooled to ambient with vigorous mixing to form a flowable suspension of the wax and polymer in the polyol.

EXAMPLE 31

55.5 g of a mixture of 5 percent by weight Elvax® 4320, 5 percent by weight Marcus® 3500, and 90 percent by weight Parvan® 1580 was added to 500.0 g of Pluracol® P410R. The mixture was heated to 82° C. to melt the wax, and the mixture was cooled to ambient with vigorous mixing to form a flowable suspension of the wax and polymer in the polyol.

EXAMPLE 32

57.1 g of a mixture of 5 percent by weight Elvax® 4320, 10 percent by weight Marcus® 3500, and 85 percent by weight Parvan® 1580 was added to 511.6 g of Pluracol® P410R. The mixture was heated to 82° C. to melt the wax, and the mixture was cooled to ambient with vigorous mixing to form a flowable suspension of the wax and polymer in the polyol.

Aliquots of the products prepared in Examples 30, 31, and 32 were diluted to 10% in Pluracol® P410R with gentle mixing. Microscope slides of each of these three diluted products were prepared and high magnification transmission images were taken using a Hirox digital microscope. The dependence of wax crystallite size and morphology on the concentration of Marcus® 3500 in the mixtures produced in Examples 30, 31, and 32 is shown in FIG. 1. This shows that the oxidized polyethylene Marcus® 3500 effectively decreases the size of the wax crystals in the polyol dispersion.

EXAMPLE 33

144 g of urea granules, nominal SGN 250-320, were heated to 75° C. 0.86 g of the mixture prepared in Example 30 was added with mixing. When the granules were evenly coated 1.16 g of Lupranate® M20 were added and mixing continued for 22 minutes at which point the urethane polymer had cured and the granules were free flowing. The additions of the product from Example 30 and Lupranate® M20 were repeated and cured to form 2 additional coats (three coats total). The coating weight was 4 percent by weight of the total coated urea.

EXAMPLE 34

144 g of urea granules, nominal SGN 250-320, were heated to 76° C. 0.86 g of the mixture prepared in Example 31 was added with mixing. When the granules were evenly coated 1.16 g of Lupranate® M20 were added and mixing continued for 21 minutes at which point the urethane polymer had cured and the granules were free flowing. The additions of the product from Example 31 and Lupranate® M20 were repeated and cured to form 2 additional coats (three coats total). The coating weight was 4 percent by weight of the total coated urea.

EXAMPLE 35

144 g of urea granules, nominal SGN 250-320, were heated to 76° C. 0.86 g of the mixture prepared in Example 32 was added with mixing. When the granules were evenly coated 1.14 g of Lupranate® M20 were added and mixing continued for 24 minutes at which point the urethane polymer had cured and the granules were free flowing. The additions of the product from Example 32 and Lupranate® M20 were repeated and cured to form 2 additional coats (three coats total). The coating weight was 4 percent by weight of the total coated urea.

To determine the controlled release properties of the coated urea products of Examples 33, 34, and 35, 10 g of the coated products were dispersed in 90 g of water and stored at 38° C. for 7 days. The urea that had released from the granules was determined by quantifying the urea in the water phase by refractive index. The results are shown in Table 8.

TABLE 8

| Example | Composition of wax/polymer in polyol component of coating | % urea released in 7 days at 38° C. |
| --- | --- | --- |
| 33 | 5 percent Elvax ® 4320, 95 percent Parvan ® 1580 | 86 |
| 34 | 5 percent Elvax ® 4320, 5 percent Marcus ® 3500, 90 percent Parvan ® 1580 | 77 |
| 35 | 5 percent Elvax ® 4320, 10 percent Marcus ® 3500, and 85 percent Parvan ® 1580 | 64 |

EXAMPLE 36

21.2 g of a mixture of 5 percent by weight Elvax® 4320 and 95 percent by weight Parvan® 1580 was added to 78.8 g of Pluracol® P410R. The mixture was heated to 90° C. to melt the wax, and the mixture was cooled to ambient with high shear mixing to form a flowable suspension of the wax and polymer in the polyol.

A portion of this suspension was warmed to 65 degrees C. with vigorous mixing and immediately processed through a manually-powered piston-type high pressure laboratory homogenizer to form a flowable, fine suspension of the wax and polymer in the polyol.

Figure 2:
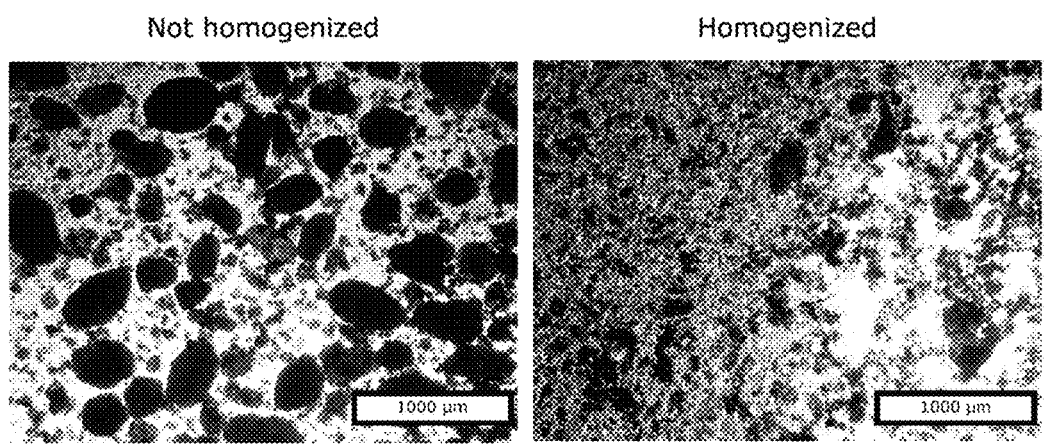
FIG. 2 is a magnified (1000 μm scale) image of the products of Example 36.

Microscope slides of the products before and after homogenizing were prepared and high magnification transmission images were taken using a Hirox digital microscope. The size dependence of the suspended particles on the method of processing is shown in FIG. 2.

EXAMPLE 37

96 g of urea granules, nominal SGN 250-320, were heated to 76° C. 0.87 g of the mixture prepared in Example 36 before homogenizing was added with mixing. When the granules were evenly coated 0.46 g of Lupranate® M20 were added and mixing continued for appx. 20 minutes at which point the urethane polymer had cured and the granules were free flowing. The additions of the product from Example 36 and Lupranate® M20 were repeated and cured to form 2 additional coats (three coats total). The coating weight was 4 percent of the total coated urea.

EXAMPLE 38

96 g of urea granules, nominal SGN 250-320, were heated to 76 degrees C. 0.87 g of the mixture prepared in Example 36 after homogenizing was added with mixing. When the granules were evenly coated 0.46 g of Lupranate® M20 were added and mixing continued for appx. 20 minutes at which point the urethane polymer had cured and the granules were free flowing. The additions of the product from Example 37 and Lupranate® M20 were repeated and cured to form 2 additional coats (three coats total). The coating weight was 4 percent of the total coated urea.

The controlled release properties of the coated urea products of Examples 37 and 38 were determined as described in Example 35. The results showing the dependence of controlled release properties on polyol processing method are shown in Table 9:

TABLE 9

| Example | Processing method of polyol component of coating | % urea released in 7 days at 38° C. |
|---|---|---|
| 37 | High shear mixing | 85 |
| 38 | Homogenization | 79 |

The invention can be embodied in other forms without departing from the spirit or essential attributes thereof. Reference should therefore be had to the following claims, rather than to the foregoing specification to determine the scope of the invention.

We claim:

1. A moisture barrier coating comprising:
   a. at least one organic wax;
   b at least one polymer soluble in the wax wherein the wax soluble polymer is at least one selected from the group consisting of ethylene-vinyl acetate copolymers and terpolymers, modified polyolefins, acrylate ester polymers and copolymers, and tackifying resins;
   c. a thermoset polymer;
   wherein the weight ratio of organic wax to wax soluble polymer is from about 50:50 to about 98:2 and wherein the weight ratio of thermoset polymer to combined organic wax and wax soluble polymer is from about 50:50 to about 98:2, and wherein the organic wax and wax soluble polymer are mixed and dispersed into at least one component of the thermoset polymer before the thermoset polymer is applied to the surface and cured, the coating comprising a semi-interpenetrating network of the wax, the wax soluble polymer, and the thermoset polymer.

2. The moisture barrier coating of claim 1, wherein the organic wax is at least one selected from the group consisting of:
   a. petroleum waxes;
   b. synthetic waxes;
   c. natural waxes; and,
   d. hydrogenated triglycerides.

3. The moisture barrier coating of claim 1, wherein the wax soluble polymer
   a. is substantially non-reactive with the said thermoset polymer
   b. forms a homogeneous mixture with the said wax at 100° C.
   c. has a viscosity of less than 10,000 centipoise at 100° C. when at least 2 percent by weight is mixed with the said wax.

4. The moisture barrier coating of claim 1, wherein the thermoset polymer is at least one selected from the group consisting of:
   a. polyurethanes;
   b. polyepoxides; and,
   c. alkyd resins.

5. The moisture barrier coating of claim 1, wherein the composition is a semi-interpenetrating polymer network.

6. The moisture barrier coating of claim 1, wherein the organic wax is a paraffin.

7. The moisture barrier coating of claim 1, wherein the wax soluble polymer is at least one selected from the group consisting of ethylene vinyl acetate copolymers and terpolymers.

8. The moisture barrier coating of claim 1, comprising at least one crystal growth modifier chosen from the group consisting of oxidized polyethylene waxes and ethylene copolymers with acrylic acid, wherein the crystal growth modifier is added at from about 0.5 to about 10 percent by weight of the mixture of the wax and wax soluble polymer.

9. The moisture barrier coating of claim 1, wherein the thermoset polymer is a polyurethane.

10. The moisture barrier coating of claim 1, wherein the thermoset polymer is a polyepoxide.

11. A controlled release fertilizer comprising a water soluble nutrient core coated with one or more moisture barrier coatings, at least one of said moisture barrier coatings comprising:
    a. at least one organic wax;
    b. at least one polymer soluble in the wax wherein the wax soluble polymer is at least one selected from the group consisting of ethylene-vinyl acetate copolymers and terpolymers, modified polyolefins, acrylate ester polymers and copolymers, and tackifying resins;
    c. a thermoset polymer;
    wherein the weight ratio of organic wax to wax soluble polymer is from about 50:50 to about 98:2 and wherein the weight ratio of thermoset polymer to combined organic wax and wax soluble polymer is from about 50:50 to about 98:2, and wherein the organic wax and wax soluble polymer are mixed and dispersed into at least one component of the thermoset polymer before the thermoset polymer is applied to the surface and cured, the coating comprising a semi-interpenetrating network of the wax, the wax soluble polymer, and the thermoset polymer.

12. The composition of claim 11, wherein a sulfur coating is applied to the nutrient core.

13. A method of producing a controlled release fertilizer comprising the steps of:
    i. providing a quantity of fertilizer particles;
    ii. heating the fertilizer particles to a temperature above the melting point of the organic wax;
    iii. providing one or more moisture barrier coatings, at least one of said moisture barrier coatings comprising:
        a. at least one organic wax
        b. at least one wax soluble polymer wherein the wax soluble polymer is at least one selected from the group consisting of ethylene-vinyl acetate copolymers and terpolymers, modified polyolefins, acrylate ester polymers and copolymers, and tackifying resins;
        c. a thermoset polymer
    wherein the weight ratio of organic wax to wax soluble polymer is from about 50:50 to about 98:2 and wherein the weight ratio of thermoset polymer to combined organic wax and wax soluble polymer is from about 50:50 to about 98:2;
    iv. mixing the organic wax and wax soluble polymer to provide a mixture
    v. dispersing the mixture into at least one component of the thermoset polymer to provide a dispersion;
    vi. applying the dispersion to the fertilizer particles while providing mixing sufficient to spread the dispersion as a coating on the fertilizer particles, and
    vii. curing the thermoset polymer on the surface of the particles to form free flowing coated granules.

14. The method of claim 13, wherein a second component of the thermoset polymer is applied after the application of the dispersion in Step vi.

15. The method of claim 13 wherein a second component of the thermoset polymer is included in the dispersion of Step v. prior to application of the dispersion to the fertilizer particles in Step vi.

* * * * *